United States Patent
Mao et al.

(10) Patent No.: US 10,620,374 B2
(45) Date of Patent: Apr. 14, 2020

(54) WAVELENGTH SELECTIVE SWITCH

(71) Applicant: Molex, LLC, Lisle, IL (US)

(72) Inventors: Hongwei Mao, Lisle, IL (US); Gongjian Hu, Lisle, IL (US); Yi Liao, Lisle, IL (US); Guijun Ji, Lisle, IL (US); Tian Zhu, Lisle, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/334,783

(22) PCT Filed: Oct. 9, 2017

(86) PCT No.: PCT/US2017/055761
§ 371 (c)(1),
(2) Date: Mar. 20, 2019

(87) PCT Pub. No.: WO2018/068038
PCT Pub. Date: Apr. 12, 2018

(65) Prior Publication Data
US 2019/0235170 A1    Aug. 1, 2019

Related U.S. Application Data

(60) Provisional application No. 62/405,667, filed on Oct. 7, 2016.

(51) Int. Cl.
*G02B 6/293*  (2006.01)
*G02B 6/35*   (2006.01)
(Continued)

(52) U.S. Cl.
CPC ......... *G02B 6/29302* (2013.01); *G02B 6/272* (2013.01); *G02B 6/2746* (2013.01);
(Continued)

(58) Field of Classification Search
None
See application file for complete search history.

(56) References Cited

U.S. PATENT DOCUMENTS

2010/0329676 A1   12/2010   Barbarossa et al.
2015/0180603 A1    6/2015   Darling et al.
(Continued)

FOREIGN PATENT DOCUMENTS

WO    03/032071 A1    4/2003
WO    2018/068038 A1  4/2018

OTHER PUBLICATIONS

International Search Report and Written Opinion received for PCT application No. PCT/US2017/055761, dated Jan. 12, 2018, 10 pages.

(Continued)

*Primary Examiner* — Jerry Rahll
(74) *Attorney, Agent, or Firm* — Molex, LLC

(57) ABSTRACT

Various methods, systems, and apparatuses, for optical switching are provided. For example, one wavelength selective switch (WSS) includes a plurality of optical ports wherein one or more optical ports are configured to receive one or more input optical beams the one or more input optical beams having a plurality of wavelength channels and wherein one or more of the optical ports are configured to receive one or more wavelength channels of the plurality of wavelength channels for output. The WSS also includes a polarization conditioning assembly, a polarization beam splitter assembly, a direction dependent polarization rotator, a polarization beam splitter, a grating, and a polarization modulator array having a plurality of polarizing modulation cells, each cell configured to independently change a polarization orientation of an optical beam passing through the cell.

9 Claims, 9 Drawing Sheets

(51) Int. Cl.
- *G02B 27/28* (2006.01)
- *G02B 6/27* (2006.01)
- *H04Q 11/00* (2006.01)
- *G02B 27/10* (2006.01)
- *G02F 1/13* (2006.01)
- *H04J 14/02* (2006.01)

(52) U.S. Cl.
CPC .......... *G02B 6/29311* (2013.01); *G02B 6/356* (2013.01); *G02B 6/3546* (2013.01); *G02B 27/285* (2013.01); *G02B 27/286* (2013.01); *G02B 6/2938* (2013.01); *G02B 27/1006* (2013.01); *G02B 27/283* (2013.01); *G02F 1/1326* (2013.01); *H04J 14/0212* (2013.01); *H04Q 11/0005* (2013.01); *H04Q 2011/0016* (2013.01); *H04Q 2011/0026* (2013.01); *H04Q 2011/0032* (2013.01); *H04Q 2011/0035* (2013.01)

(56) References Cited

U.S. PATENT DOCUMENTS

2015/0208143 A1 7/2015 Frisken
2015/0212275 A1 7/2015 Mao et al.

OTHER PUBLICATIONS

International Preliminary Report on Patentability received for PCT Application No. PCT/US2017/055781, dated Apr. 18, 2019, 9 pages.

WAVELENGTH SELECTIVE SWITCH

RELATED APPLICATIONS

This application claims priority to PCT Application No. PCT/US2017/055761, filed on Oct. 9, 2017, which further claims priority to U.S. Provisional Application No. 62/405,667, filed Oct. 7, 2016, which are incorporated herein by reference in their entirety.

BACKGROUND

This specification relates to optical technology.

Optical switches are typically used in optical communication systems. An optical switch is a switch that enables optical signals in, e.g., optical fibers, to be selectively switched from one optical fiber to another. A conventional wavelength switch is typically used for wavelength multiplexing/demultiplexing of wavelength division multiplexed ("WDM") optical signals and includes structures for switching optical signals on a per-wavelength basis

SUMMARY

Various methods, systems, and apparatuses, for optical switching are provided. For example, one wavelength selective switch (WSS) includes a plurality of optical ports wherein one or more optical ports are configured to receive one or more input optical beams the one or more input optical beams having a plurality of wavelength channels and wherein one or more of the optical ports are configured to receive one or more wavelength channels of the plurality of wavelength channels for output. The WSS also includes a polarization conditioning assembly, a polarization beam splitter assembly, a direction dependent polarization rotator, a polarization beam splitter, a grating, and a polarization modulator array having a plurality of polarizing modulation cells, each cell configured to independently change a polarization orientation of an optical beam passing through the cell.

The foregoing and other embodiments can each optionally include one or more of the following features, alone or in combination. The polarization conditioning assembly is configured to condition the input optical beam such that the one or more input optical beams have a uniform polarization orientation. The wavelength selective switch includes a beam expander optical coupled between the polarization beam splitter and the grating. The polarization modulator array is a liquid crystal cell array. The polarization modulator array is a thin film transistor liquid crystal panel or a liquid crystal on silicon. The wavelength selective switch includes one or more focusing lenses and one or more folding mirrors respectively optically coupled between the polarization modulator array and the grating. At least one of the one or more focusing lenses focuses the particular wavelength channels on respective pixels of the polarization modulator array. The polarization beam splitter assembly includes stack of polarization beam splitters, wherein each polarization beam splitter of the stack is associated with particular optical ports of the plurality of optical ports. The direction dependent polarization rotator comprises a garnet and a half wave plate. The wavelength selective switch is configured to selectively operate as a multiplexer for light beams input to particular optical ports of the plurality of optical ports and to operate as a demultiplexer for light beam input to a particular designated common port of the plurality of optical ports.

A dual wavelength selective switch (WSS) is also provided and includes first and second common port collimators, wherein each common port collimator is configured to receive one or more input optical beams the one or more input optical beams having a plurality of wavelength channels. The dual WSS also includes first polarization conditioning optics, first beam expansion optics, a first dispersion component, a polarization modulator array having a plurality of polarizing modulation cells, each cell configured to independently change a polarization orientation of an optical beam passing through the cell, a second dispersion component, second beam expansion optics, a polarization beam splitter array, second polarization conditioning optics, and first and second sets of branch port collimators.

The foregoing and other embodiments can each optionally include one or more of the following features, alone or in combination. Each common port collimator corresponds to a common port for a respective wavelength selective switch of the dual wavelength selective switch. The first polarization conditioning optics and second polarization conditioning optics are configured to condition an input optical beam such that the one or more input optical beams have a uniform polarization orientation. The dual WSS also includes a first lens optically coupled to a first side of the polarization modulator array and a second lens optically coupled to a second side of the polarization modulator array. One or more of the first and second lenses are configured to focus particular wavelength channels of light beams on respective pixels of the polarization modulator array. The first common port collimator is optically coupled to the first set of branch port collimators and wherein the second common port collimator is optically coupled to the second set of branch port collimators. Optical paths of light beams between the first common port and the first set of branch port collimators are separated from the optical paths of light beams between the second common port and the second set of branch port collimators. The first and second dispersion components comprise respective gratings. The polarization beam splitter array includes stack of polarization beam splitters, wherein each polarization beam splitter of the stack is associated with particular branch collimators of the first and second sets of branch port collimators.

Particular embodiments of the subject matter described in this specification can be implemented so as to realize one or more of the following advantages. A twin 1×N (N×1) wavelength selective switch (WSS) can be used to upgrade conventional colored reconfigurable optical add-drop multiplexers to full CDC (colorless, directionless, contentionless) functionality. Port isolation can be increased for the WSS. The WSS can provide low node loss keeping a high optical signal-to-noise ration that can allow high speed throughput, e.g., at 400 GB/s or greater.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
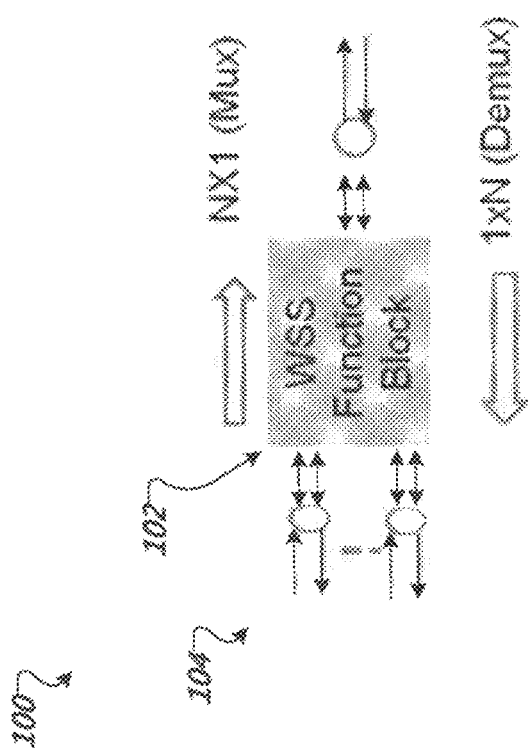
FIG. 1 is an example diagram of an example WSS.

FIG. 1 is an example diagram of an example WSS 100. The WSS 100 includes a wavelength selective switching function block 102 and a free space circulator assembly 104. The free-space circulator assembly 104 is integrated into the WSS and shares the same optics for wavelength selective switching functions to provide a twin wavelength selective switch. The switching functions provided by the wavelength selective switching function block 102 include N×1 multiplexer (dashed arrows) in which N input signals are combined to a single output port and a 1×N demultiplexer (solid arrows) in which a single input is routed to N output ports.

Figure 2:
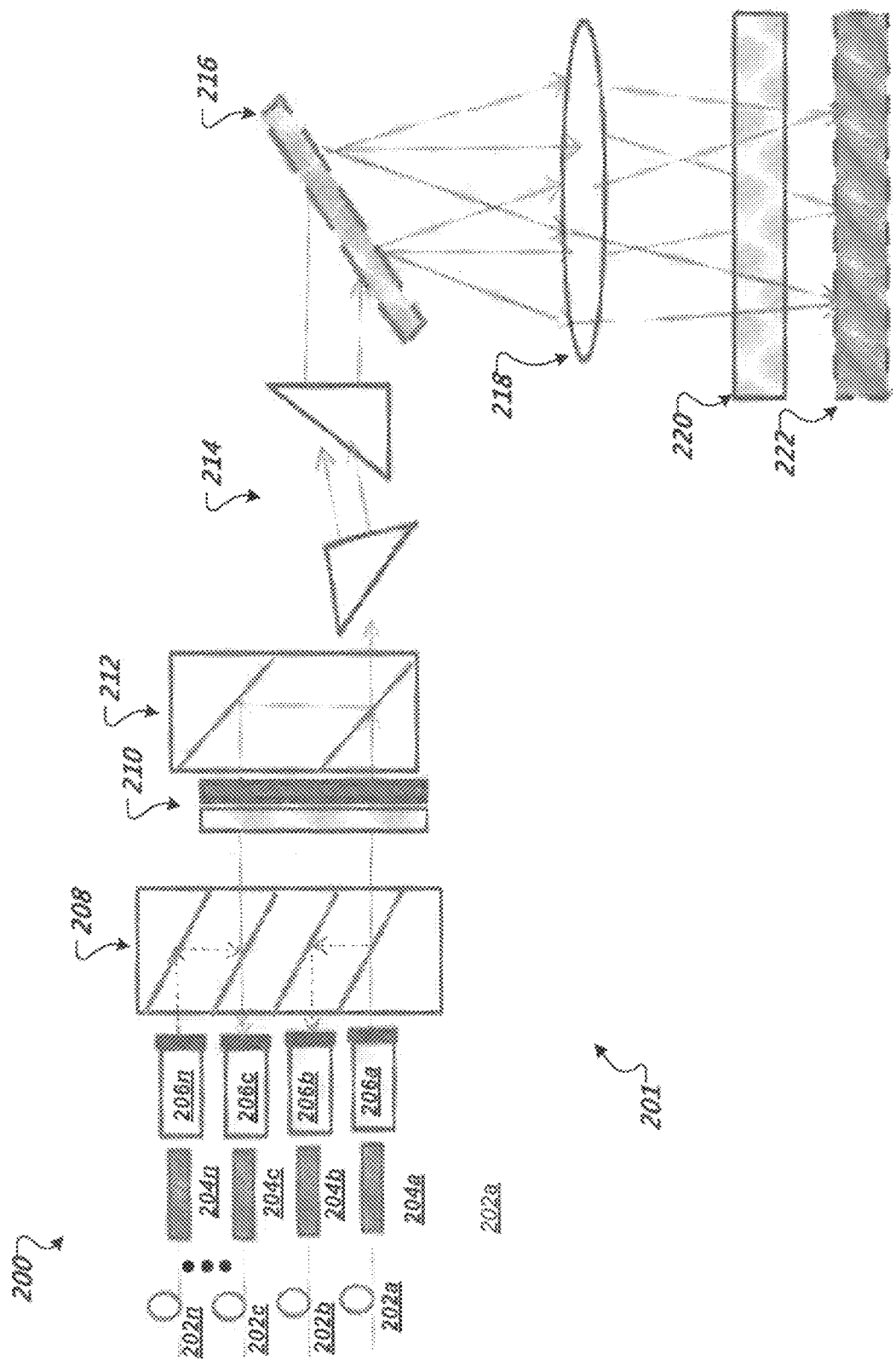
FIG. 2 shows a block diagram of an example 1×N WSS oriented on a dispersion plane.
Figure 3:
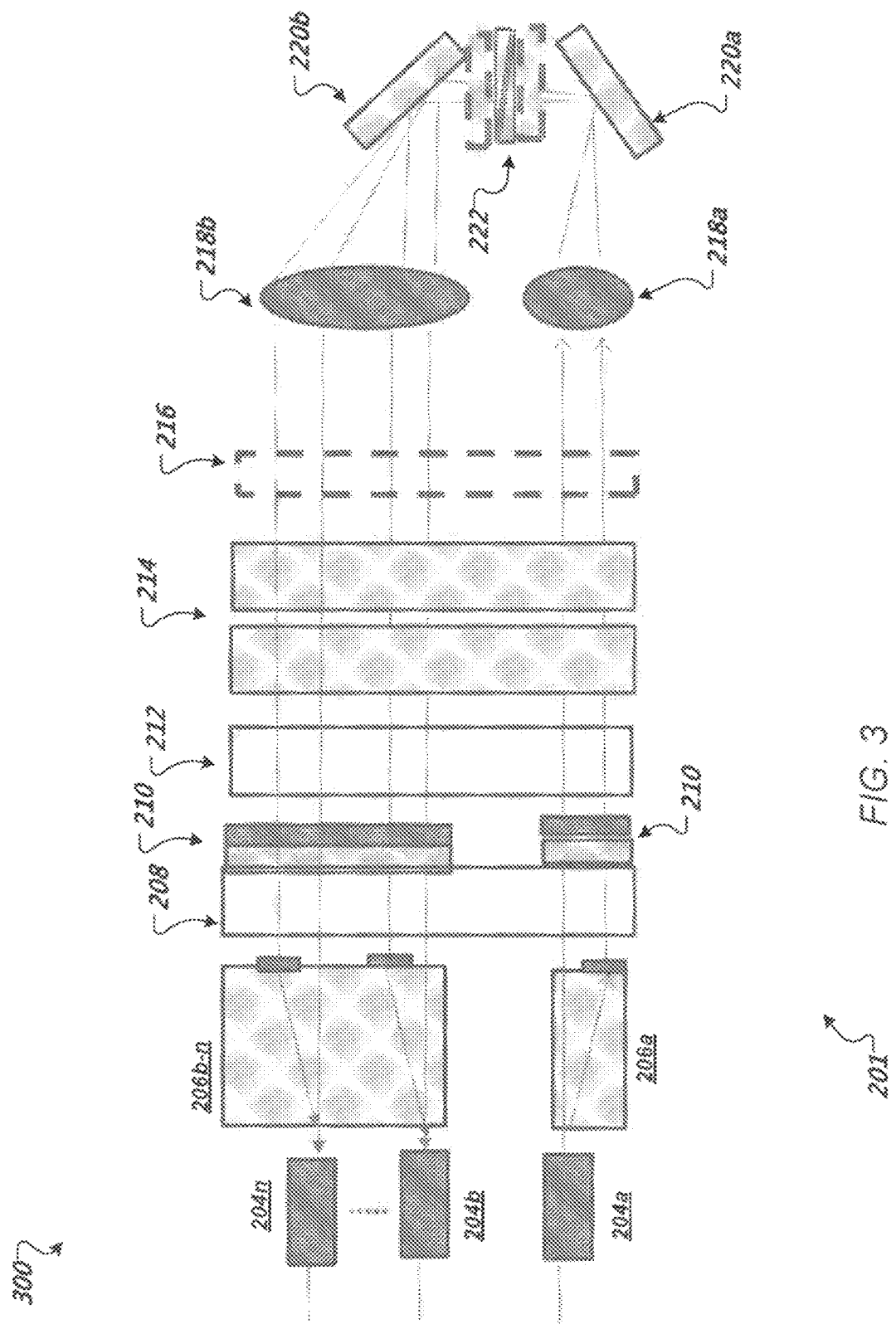
FIG. 3 shows a block diagram of an example of the 1×N WSS oriented on the port switching plane.

FIG. 2 shows a block diagram 200 of an example 1×N WSS 201 oriented on a dispersion plane. FIG. 3 shows a block diagram 300 of an example of the 1×N WSS 201 oriented on the port switching plane. Thus, FIG. 2 and FIG. 3 provide representations of the same wavelength selecting switch from different orientations. The 1×N WSS 201 can selectively operate as a 1×N WSS demultiplexer or an N×1 WSS multiplexer.

The WSS 200 includes optical fibers 202a-n coupled to respective collimators 204a-n. An optical beam input through a particular optical fiber 202 can include multiple channels, e.g., for transmitting data. Each channel can be a wavelength channel having an optical signal having a different wavelength ($\square$). For example, an optical beam can be composed of individual channels having wavelengths $\square_1$, $\square_2$, $\square_3$, $\square_4$, and $\square_\square$.

Additionally, the input optical beam can be randomly polarized. In some implementations, one or more of the corresponding optical fibers 202a-n can be a single mode fiber that provides an input optical signal having two orthogonal polarizations relative to the path of the input optical beam. However, it is typically unknown which wavelength channels have which polarizations.

Each collimator 204a-n is coupled to a corresponding polarization condition assembly 206a-n. Each polarization conditioning assembly includes a walk off crystal and a half wave plate. The walk off crystal is a birefringence material that decomposes the input optical signal according to polarization. In particular, an input optical signal is divided into orthogonal polarizations, each following a different path through the walk off crystal.

The half wave plate rotates the polarization of light beams passing through the half wave plate by 90 degrees. In particular, the half wave plate can be positioned such that only one of the beams separated by the walk off crystal is incident. As a result, an input optical beam having a random polarization exits the polarization conditioning assembly as two light beams having the same polarization.

The polarization condition assemblies 206a-n are optically coupled to a polarization beam splitter assembly 208. The polarization beam splitter assembly 208 includes an array of polarization beam splitters (e.g., a stack) associated with one or more of the polarization conditioning assemblies 206a-n. Each polarization beam splitter of the polarization beam splitter assembly 208 is configured to pass light beams having a first polarization direction and reflect light beams having a second, orthogonal, polarization. For example, input light beams at a first port of a polarization beam splitter can pass light beams of a first polarization to a first output port and light beams of a second polarization to a second output port.

Outputs from the polarization beam splitters of the polarization beam splitter assembly 208 are incident on a direction dependent polarization rotator 210. The direction dependent polarization rotator 210 can be formed from a garnet material and a half wave plate.

The direction dependent polarization rotator 210 is optically coupled to a polarization beam splitter 212. In some implementations, the polarization beam splitter 212 includes one or more polarization beam splitters in a stack similar to the polarization beam splitter array 208.

The polarization beam splitter 212 is optically coupled to a beam expander 214 formed in this example from a pair of prisms. The beam expander 214 is designed to spread out light beams from the polarization beam splitter by a specified amount as an expanded input beam. In particular, the beam expander 214 can be designed to expand the light beams along a single axis, e.g., along the X-Z direction.

The beam expander 214 is optically coupled to a grating 216. The grating 216 separates the expanded input beam according to wavelength such that each wavelength follows a distinct path (e.g., a particular angle from the grating). The grating can be a diffraction grating that splits and diffracts light into several beams travelling in different directions. The directions of these beams depend on the spacing of the grating and the wavelength of the light so that the grating acts as the dispersive element separating the different wavelength channels of the expanded optical beam.

The grating 216 is optically coupled to a focusing lens 218. The focusing lens 218 is positioned between the grating 216 and folding mirrors 220a-b such that optical beams exiting the focusing lens 218 are reflected off of folding mirrors 220a-b and focused on a liquid crystal polarization modulator array 222.

In some implementations, focusing lens 218 is one of a pair of cylindrical lenses, 218a, 218b in FIG. 3, placed on the plane perpendicular to the plane of wavelength dispersion. Focusing lens 218 is a cylindrical lens for the beam focusing on the wavelength dispersion plane and positioned such that the grating 216 is located at a front focus plane of the focusing lens 218. Alternatively, the focusing lenses 218 can use spherical or other types of lenses instead of cylindrical lenses.

The result of the focusing lenses 218 is to map the different wavelength channels into different locations in space at a focus plane of the focusing lens 218. Beam folding optics provided by folding mirrors 220a-b are provided such that the same optical components can be shared along a return path through the wavelength selective switch 200 to particular output fibers.

The liquid crystal polarization modulator array 222 is positioned at the focus plane of optical components including the focusing lens 218a-b. The liquid crystal polarization modulator array 222 can be a liquid crystal cell array that includes a number of separate polarizing modulation cells e.g., pixel cells. Each pixel can be independently controlled such that the pixel either rotates the polarization orientation of light incident on the pixel (e.g., by 90 degrees) or does not change the polarization. For example, electric voltage though a particular cell can cause reorientation of the liquid crystal. Whether polarization is rotated or not can depend on whether the liquid crystal is reoriented. In addition to a liquid crystal array, the liquid crystal polarization modulator array 222 can also be a thin film transistor liquid crystal panel or a liquid crystal on silicon.

Each polarizing modulation cell of the liquid crystal polarization modulator array 222 can be designed to provide polarization control for a specific wavelength channel. As such, the liquid crystal polarization modulator array 222 can be configured to independent control the polarization state of each individual wavelength channel according to the desired combination of wavelengths at each polarization state/orientation. For example, for a particular desired routing of wavelength channels, the liquid crystal polarization modulator array 222 can be programmed to produce particular polarizations of the wavelengths in order to achieve a desired routing to particular output fibers of the optical fibers 202a-n.

The collimators 204a-n, polarization conditioning assemblies 206a-n, polarization beam splitter assembly 208, and direction dependent polarization rotator 210 form a free space circulator assembly. The polarization beam splitter 212, beam expander 214, grating 216, focusing lens 218, folding mirror 220, and liquid crystal polarization modulator array 222 form a wavelength selective switching function block.

In operation as an N×1 demultiplexer WSS, an input optical beam having multiple wavelength channels is input to an input fiber. In particular, in the example shown in FIGS. 2-3, the input optical beam is received at input optical fiber 202a. The input optical beam is collimated by the collimator 204a. The collimated light beam passes through polarization conditioning assembly 206a. The walk off crystal decomposes the input optical signal according to polarization. In particular, the input optical beam is divided into orthogonal polarizations, each following a different path through the walk off crystal. The half wave plate rotates the polarization light output from one of the paths through the walk off crystal by 90 degrees. As a result, the input optical beam leaves the polarization conditioning as two components having identical polarization directions. Thus, the input optical beam is represented by a single known polarization.

The polarization direction allows the optical beam to pass through polarization beam splitter assembly 208 and is incident on the direction dependent polarization rotator 210. In the direction of the input optical beam, the direction deponent polarization rotator 210 does not rotate the polarization direction of the input light beam. The input optical beam then is routed through polarization beam splitter 212. Again, because of the polarization direction of the input optical beam, the optical beam is passed straight through the polarization beam splitter 212 to the beam expander 214.

The components of the input optical beam enter the beam expander 214. The beam expander spreads out the input optical beam components by a specified amount as an expanded input beam. The expanded input beam is then projected onto the grating 216. The grating 216 separates the expanded input beam according to wavelength such that each wavelength follows a distinct path (e.g., a particular angle from the grating).

The separated input beam is then focused by the focusing lens 218a onto the liquid crystal polarization modulator array 222 due to folding mirror 220a. In particular, separated wavelengths of the input beam are incident on particular polarization modulation cells that controllably produce particular polarizations of the respective wavelengths according to a particular combination of output optical signals each having one or more wavelengths.

The separated wavelengths of the light beam having polarizations controlled by the liquid crystal polarization modulator array 222 are reflected by folding mirror 220b and focused by lens 218b back on the grating 216. The light beam with different wavelengths and switched polarization can be recombined into one or more polarization switched light beams after the grating 216 and beam expander 214. However, the different wavelengths in the polarization switched light beams have a polarization coded by the corresponding liquid crystal cell pixel. Thus, the polarization switched light beams can include wavelengths having different orthogonal polarizations.

The polarization switched light beams pass back through the polarization beam splitter 212. Depending on the polarization direction of the wavelengths, portions of the polarization switched light beam may pass directly through the polarization beam splitter 212 or may be reflected by the polarization beam splitter 212 to a different output depending on the entry location of the particular polarization switched light beams.

The polarization switched light beams exiting the polarization beam splitter 212 have their respective polarization directions rotated by 90 degrees after passing through the direction dependent polarization rotator 210. These rotated polarization switched light beams are then incident on the polarization beam splitter array 208. Similar to the polarization beam splitter 212, the polarization beam splitter array 208 allows particular wavelength of the polarization switched light beams to pass directly through the polarization beam splitter array 208 or be reflected to a different output location in the polarization beam splitter array 208. Portions of the polarization switched light beams directed at particular output ports based on the exit location of the polarization beam splitter array 208 pass through the polarization conditioning assembly 206 that directs the corresponding portions of the polarization switched light beams to a particular output port, e.g., output fibers 204b-n.

Consequently, depending on the particular coding of the liquid crystal polarization modulator array 222, an input light beam having multiple wavelengths can be demultiplexed such that individual wavelengths are routed to one or more output ports depending on the polarization coding applied to particular wavelengths of the multiple wavelengths.

In operation as a N×1 MUX, input fiber 202a is used as a common output port while one or more other input fibers 202b-n can be used as input ports for optical light beams having one or more wavelengths. Following a reverse path through the WSS 201 from the DEMUX discussion above, each of the input optical beams is routed to the common output port.

Figure 4:
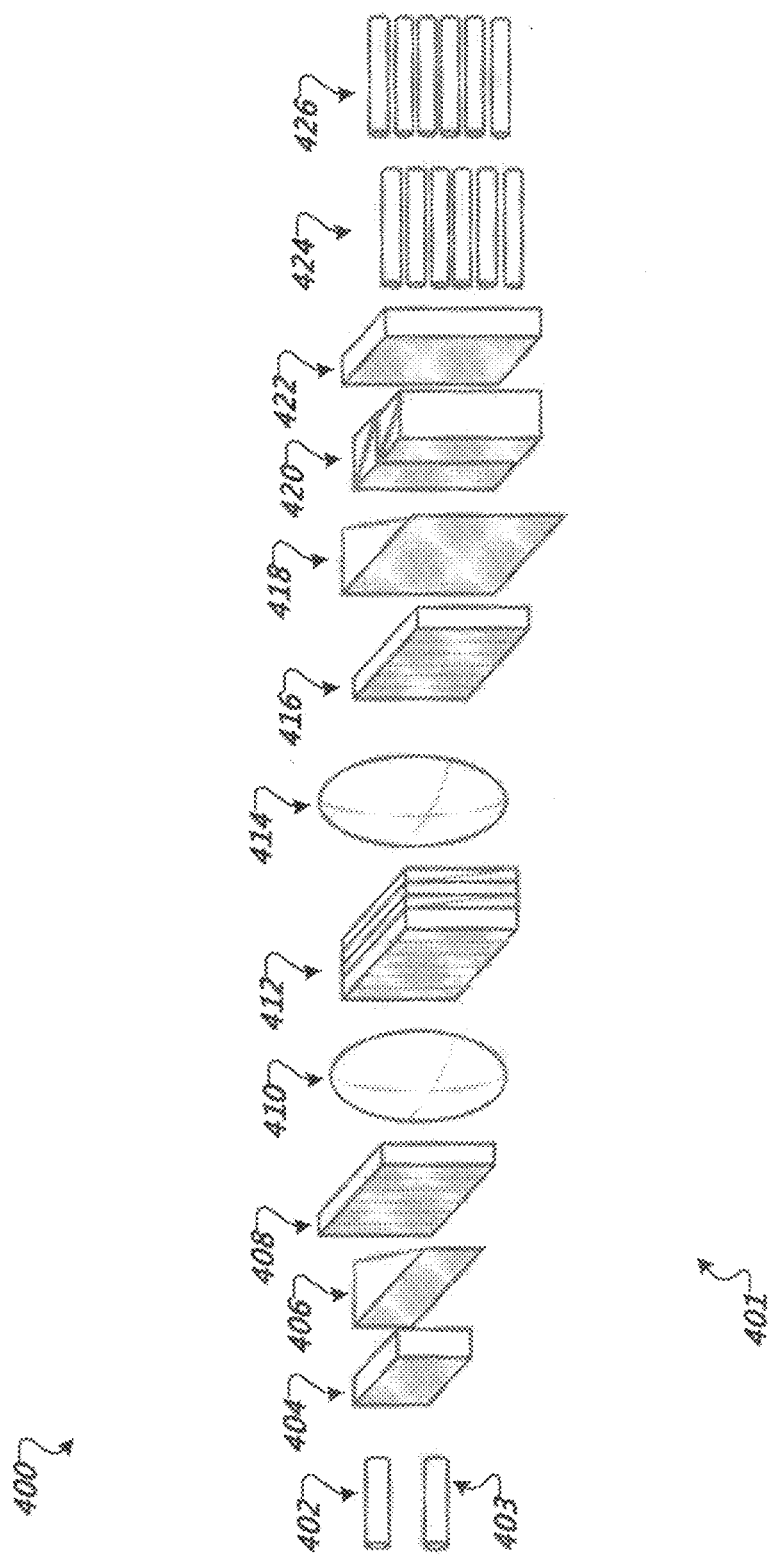
FIG. 4 shows a block diagram of an example dual 1×N WSS.
Figure 5:
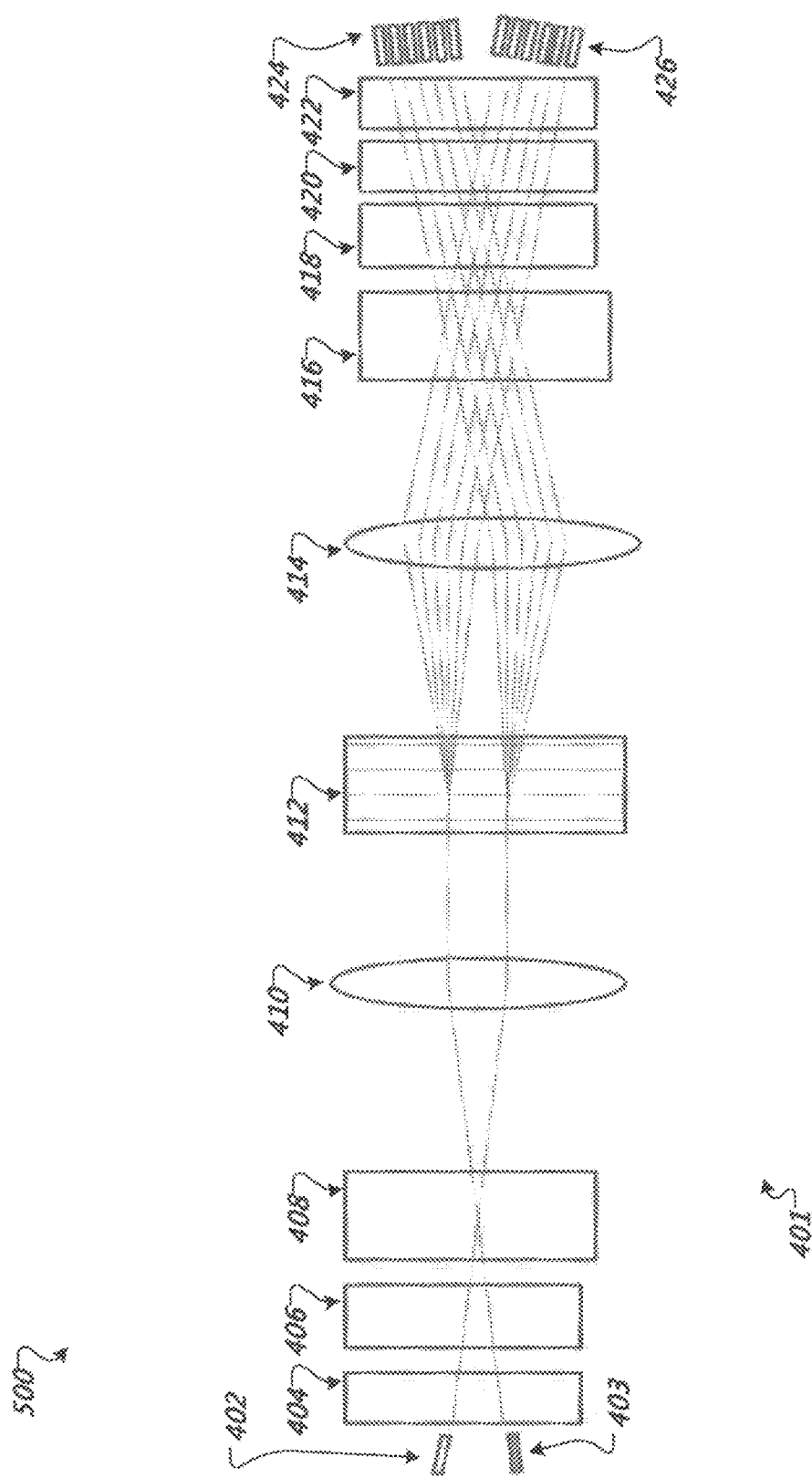
FIG. 5 shows a block diagram of the example dual 1×N WSS oriented on a port switching plane.

FIG. 4 shows a block diagram 400 of an example dual 1×N WSS 401. FIG. 5 shows a block diagram 500 of the example dual 1×N WSS 401 oriented on a port switching plane. Thus, FIGS. 4 and 5 provide representations of the same wavelength selecting switch 401 from different perspectives.

The dual WSS 401 allows for the operation of two independent WSS's using a common set of optical components. The dual WSS 401 includes common port collimators 402 and 403, each common port collimator corresponding to a common port for a respective WSS of the dual WSS 401. Operating as a 1×N demultiplexer, the respective common port collimators can each receive an optical input beam having multiple wavelengths that are routed to respective branch port collimators 424, 426. Operating as an N×1 multiplexer, the respective common ports collimators can receive a combined light beam for output, e.g., to an optical fiber. Input light beams can be received at the dual WSS 401 from one or more branch collimators of a respective set of branch collimators 424, 426 associated with the corresponding common port collimator 402, 403.

The dual WSS 401 includes, in sequence from common port collimators 402 and 403, first polarization conditioning optics 404, first beam expansion optics 406, a first dispersion component 408, a first lens 410, a polarization modulator array 412, a second lens 414, a second dispersion component 416, second beam expansion optics 418, a polarization beam splitter array 420, second polarization conditioning optics 422, and respective sets of branch port collimators 424 and 426.

For clarity, each of these components will be described with respect to the path of light from one of the common port collimators 402, 403 through the dual WSS 401, and to respective branch output ports of a particular set of branch port collimators 424,426 associated with the corresponding common port collimator. For convenience, this will be referred to as a demultiplexing direction. The wavelength selective switch is bi-directional such that the dual WSS 401 becomes a dual N×1 switch having receiving input to the respective sets of branch port collimators 424, 426 that are output from the corresponding common port, which will be referred to as a multiplexing direction.

In the demultiplexing direction, an input optical beam at a first common port collimator 402 can include multiple channels, e.g., for transmitting data. Each channel can be a wavelength channel having an optical signal having a different wavelength (□). For example, an optical beam can be composed of individual channels having wavelengths $\Box_1$, $\Box_2$, $\Box_3$, $\Box_4$, and $\Box_\Box$.

Additionally, the input optical beam can be randomly polarized. In some implementations, a single mode fiber input to the first common port collimator 402 provides an input optical signal having two orthogonal polarizations relative to the path of the input optical beam. However, it is typically unknown which wavelength channels have which polarization.

The randomly polarized input optical beam enters the wavelength selective switch 401 through the first common port collimator 402. The input optical beam undergoes polarization conditioning provided by first polarization conditioning optics 404. The polarization conditioning optics 404 include a walk off crystal and a half wave plate. The walk off crystal is a birefringence material that decomposes the input optical signal according to polarization. In particular, the input optical signal is divided into orthogonal polarizations, each following a different path through the walk off crystal.

The half wave plate is positioned to rotate the polarization light output from one of the paths through the walk off crystal by 90 degrees. As a result, the input optical signal leaves the polarization conditioning as two beams having identical polarization directions. Thus, the input optical beam is represented by a single known polarization.

The two light beams enter the first expansion optics 406. The first expansion optics 406 can include a first prism optically coupled to the first polarization conditioning optics 404. The first expansion optics 406 spreads out the two light beams from the polarization conditioning by a specified amount as an expanded input light beam. In some implementations, the beam first expansion optics 406 can be designed to expand the light beams along a single axis, e.g., along the X-Z direction.

The expanded input light beams are then projected onto the first dispersion component 408. For example, the first dispersion component 408 can be a grating. The grating separates the expanded input light beam according to wavelength such that each wavelength follows a distinct path (e.g., a particular angle from the grating). The grating can be, for example, a diffraction grating that splits and diffracts light into several beams travelling in different directions. The directions of these beams depend on the spacing of the grating and the wavelength of the light so that the grating acts as the dispersive element separating the different wavelength channels of the expanded optical beam.

The expanded light beams exiting the first dispersion component 408 are focused by the first lens 410 onto the polarization modulator array 412. The polarization modulator array 412 is positioned at the focus plane of optical components including the first lens 410 and the second lens 414 on an opposite side of the polarization modulator array 412. The polarization modulator array 412 can be a liquid crystal cell array that includes a number of separate polarizing modulation cells e.g., pixel cells. Each pixel can be independently controlled such that the pixel either rotates the polarization orientation of light incident on the pixel (e.g., by 90 degrees) or does not change the polarization. For example, electric voltage though a particular cell can cause reorientation of the liquid crystal. Whether polarization is rotated or not can depend on whether the liquid crystal is reoriented. In addition to a liquid crystal array, the polarization modulator array 412 can also be a thin film transistor liquid crystal panel or a liquid crystal on silicon.

Each polarizing modulation cell of the polarization modulator array 412 can be designed to provide polarization control for a specific wavelength channel. As such, the polarization modulator array 412 can be configured to independent control the polarization state of each individual wavelength channel according to the desired combination of wavelengths at each polarization state/orientation. For example, for a particular desired routing of wavelength channels, the polarization modulator array 412 can be programmed to produce particular polarizations of the wavelengths to achieve the desired port routing to particular branch output collimators as described below.

The polarization switched wavelengths exiting the polarization modulator array 412 are focused by the second lens 414 onto the second dispersion component 416. For example, the second dispersion component 416 can be a diffraction grating. The grating cancels out the previous dispersion generated by the first dispersion component 408. The polarization switched wavelengths then pass through the second beam expansion optics 416, which, in the demultiplexing direction from the second dispersion component 418 contracts the expanded polarization switched wavelengths into one or more polarization switched optical beams.

The polarization switched optical beams are incident on the polarization beam splitter array 420. The polarization beam splitter array 420 includes multiple polarization beam splitters, e.g., in a stack. Depending on which polarization beam splitter an incident optical beam enters and the polarization of the component wavelengths of the respective optical beams, the component wavelengths are routed to a particular output of the polarization beam splitter array 420. For example, wavelengths having a first polarization can pass directly through the polarization beam splitter array 420 while wavelengths having a second polarization orthogonal to the first polarization are reflected to a different output of the polarization beam splitter array 420. Each output is associated with a particular branch port collimator of the corresponding set of branch port collimators associated with the given common port collimator.

Upon exiting the polarization beam splitter array 420, each light beam enters the second polarization conditioning optics 422 which direct the light beams to the corresponding branch port collimators.

In the multiplexing direction, with respect to one WSS of the dual WSS 401, input light beams from one or more branch port collimators of the first set of branch port collimators 424 pass through the second polarization conditioning optics 422. The polarization conditioning of the input light beams is provided by the second polarization conditioning optics 422, which include a walk off crystal and a half wave plate. The walk off crystal is a birefringence material that decomposes the input optical signal according to polarization. In particular, the input light beams are divided into orthogonal polarizations, each following a different path through the walk off crystal.

The half wave plate rotates the polarization light output from one of the paths through the walk off crystal by 90 degrees. As a result, each input light beam leaves the polarization conditioning as two light beams having identical polarization directions. Thus, the input light beams are represented by a single known polarization.

The input light beams pass through the polarization beam splitter array 420. Depending on which polarization beam splitter of the polarization beam splitter array 420 particular light beams enter, they are routed to a corresponding output port. Since the input light beams have a common polarization, each beam is treated the same by each respective polarization beam splitter in the polarization beam splitter array 420.

The light beams that are output from the polarization beam splitter array 420 pass through second beam expansion optics 418 and the expanded light beams pass through the second dispersion component 416. The wavelength separated light beams are focused by second lens 414 onto the polarization modulator array 412. As described above, the polarization modulator array 412 can encode particular polarizations for individual wavelengths of the light beams.

Continuing in the multiplexing direction, the polarization switched light beams are focused by the first lens 410 onto the first dispersion component 408. The first dispersion component 408 cancels out the dispersion from the second dispersion component 416. The polarization switched light beams then pass through the first beam expansion optics 406, which, in the multiplexing direction, bring the polarization switched light beams closer together, reversing the earlier expansion by the second beam expansion optics 418. The polarization switched light beams then pass through the first polarization conditioning optics 404, which output a single light beam having different polarizations to the common port collimator 403 as output.

Figure 6:
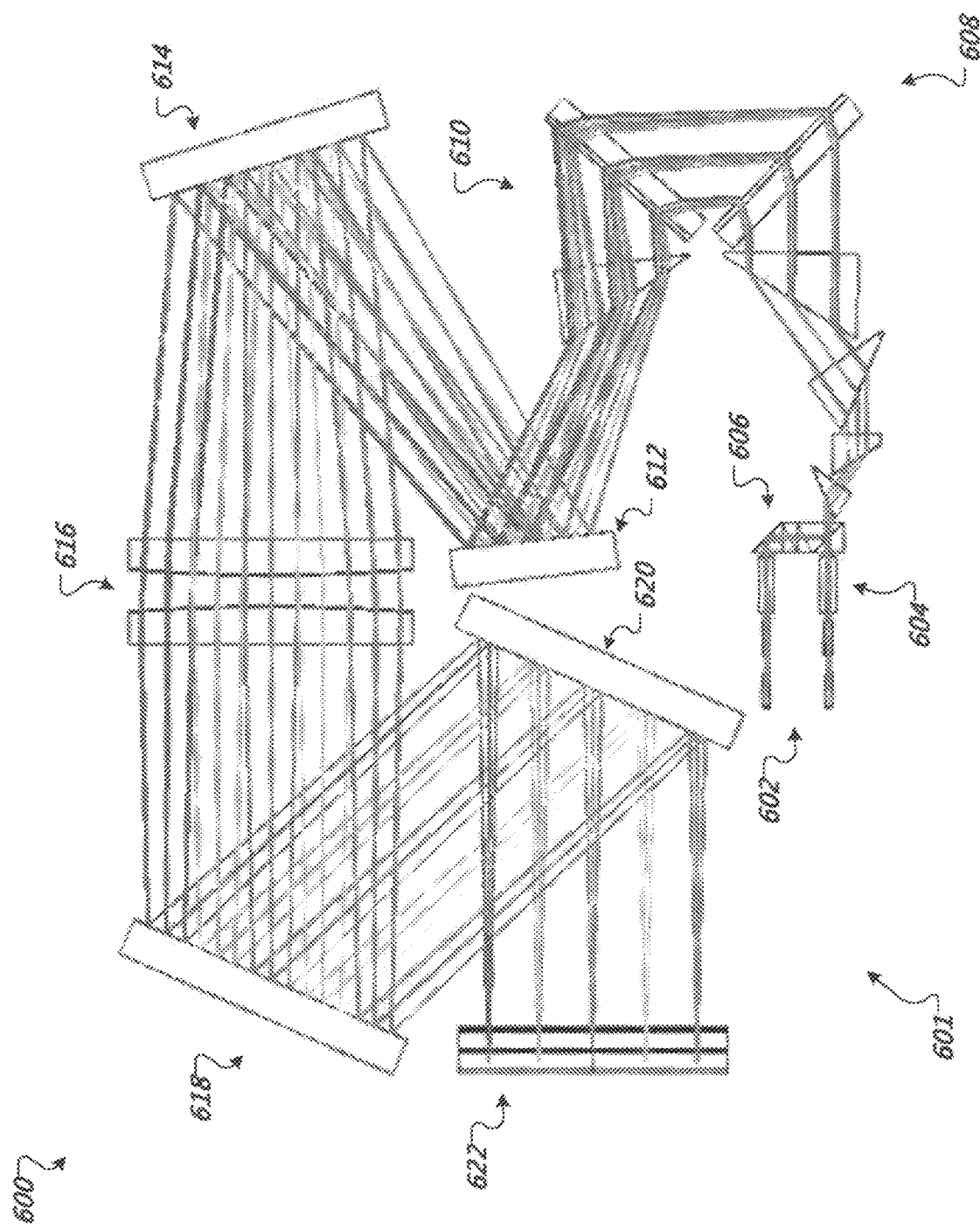
FIG. 6 shows a block diagram of an example dual 1×N WSS oriented on a wavelength dispersion plane with folding optics.

FIG. 6 shows a block diagram 600 of an example dual 1×N WSS 601 on a wavelength dispersion plane with folding optics. The dual 1×N WSS 601 is similar to the dual WSS 401 of FIG. 4 and the common components function is a similar manner. However, the WSS 601 uses folding mirrors to share optics and provide a more compact WSS.

The dual WSS 601 allows for the operation of two independent WSS's using a common set of optical components. The dual WSS 601 includes common port and branch port collimators 602, each common port collimator corresponding to a common port for a respective WSS of the dual WSS 601. Operating as a 1×N demultiplexer, the respective common port collimators can each receive an optical input beam having multiple wavelengths that are routed to respective branch output port collimators. Operating as an N×1 multiplexer, the respective common ports can receive a combined light beam for output, e.g., to an optical fiber. Input light beams can be received at the dual WSS 601 from one or more branch collimators of a respective set of branch collimators associated with the corresponding common port collimator.

The dual WSS 601 includes, in sequence from the common port and branch port collimators 602, polarization conditioning optics 604, a polarization beam splitter array 606, beam expansion optics 608, dispersion components 610, a first folding mirror 612, a second folding mirror 614, lenses 616, a third folding mirror 618, a fourth folding mirror 620, and a polarization modulator array 622.

Similar to the dual WSS 401 of FIG. 1, in the multiplexing direction, light beams input at a common port undergo polarization conditioning by the polarization conditioning optics 604 including a birefringent element and a half wave plate. The output light beams having a same polarization direction pass through the polarization beam splitter array 606 and are expanded by beam expansion optics 608 and dispersion component 610. The dispersion components 610 can include a pair of gratings and one or more prisms.

The expanded light beams are reflected by the first and second folding mirrors 612 and 614 to the first and second lenses 616. The lenses focus the expanded light beams on the third folding mirror 618, which reflects the light beams to the fourth folding mirror 620. The fourth folding mirror directs the expanded light beams onto the polarization modulator array 622.

The polarization switched wavelengths from the polarization modulator array 622 follow a reverse path through the WSS wherein the reverse direction cancels the dispersion and expansion provided by the respective components. The polarization beam splitter array 606 routes particular polarization switched wavelengths toward particular branch port collimators associated with the corresponding common port of the particular WSS of the dual WSS 601.

Figure 7:
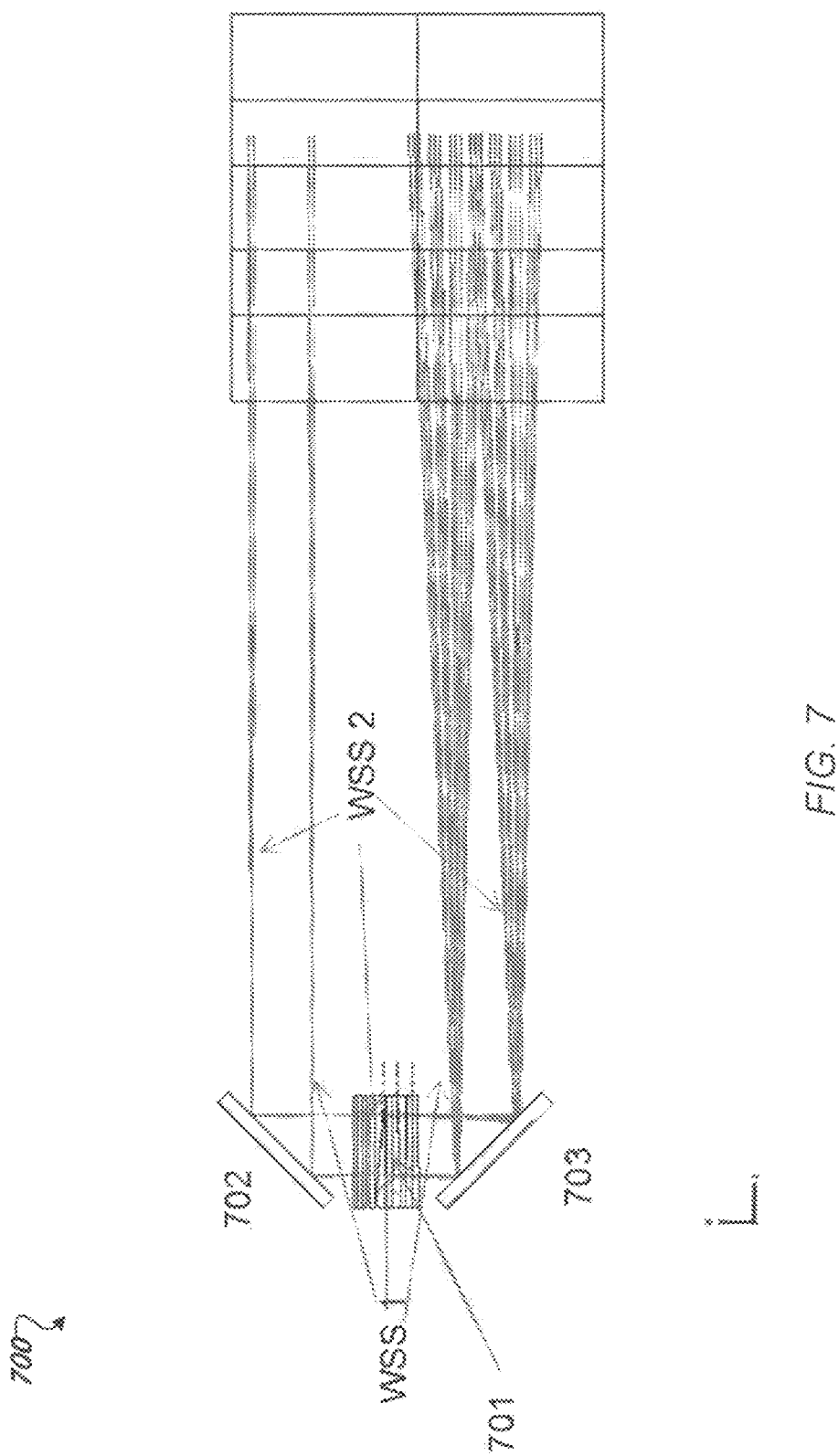
FIG. 7 shows a block diagram of a portion of the example dual 1×N WSS oriented on a port switching plane.

FIG. 7 shows a block diagram of a portion 700 of an example dual 1×N WSS on a port switching plane. In particular, block diagram 700 illustrates a simplified portion of the dual WSS 401 including folding optics to provide a more compact structure. Additionally, the block diagram 700 shows the different routings for the respective WSS's of the dual WSS 401. In particular, block diagram 700 shows a first path 702 for light beams of a first WSS of the dual WSS between a first common port and a first set of branch ports. Block diagram 700 also shows a second path 704 for light beams of a second WSS of the dual WSS between a second common port and a second set of branch ports. The respective light paths can be folded around a polarization modulator array 706 by folding optics 708*a-b* to reduce the number of optical components. Additionally, dual WSS provides a channel plan separation between the first and second WSS to ensue independent operation.

Figure 8:
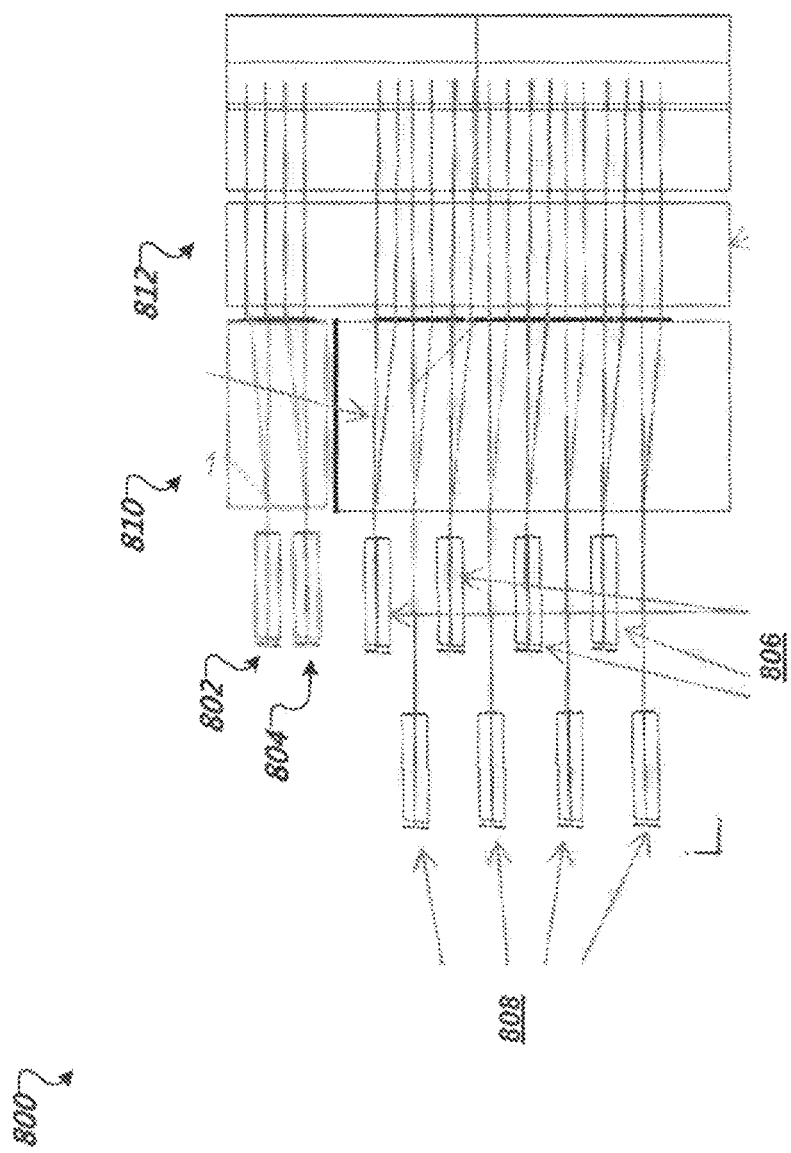
FIG. 8 shows a block diagram of a portion of the example dual 1×N WSS oriented on a port switching plane.

FIG. 8 shows a block diagram 800 of a portion of an example dual 1×N WSS 801 on a port switching plane. In particular, block diagram 800 of FIG. 8 illustrates an arrangement of port placement for the dual WSS 801. A top layer includes a first common port 802 for a first WSS and a second common port 804 for a second WSS of the dual WSS 801. A bottom layer includes a first set of branch port collimators 806 for the first WSS and a second set of branch port collimators 808 for the second WSS. The first set of branch port collimators and the second set of branch port collimators are interleaved. Additionally, both the common port collimators and the branch port collimators are positioned relative to the other components including polarization conditioning optics 810 and polarization beam splitter array 812, so that there isn't interference between the light beams of the first and second WSS of the dual WSS 801. The polarization conditioning optics 810 are used to separate, convert, and recombine polarizations of light beams in both a multiplexer and demultiplexer operation. The polarization beam splitter array 812 is used to separate a light beam into orthogonal polarization components or to recombine two beams having orthogonal polarizations.

Figure 9:
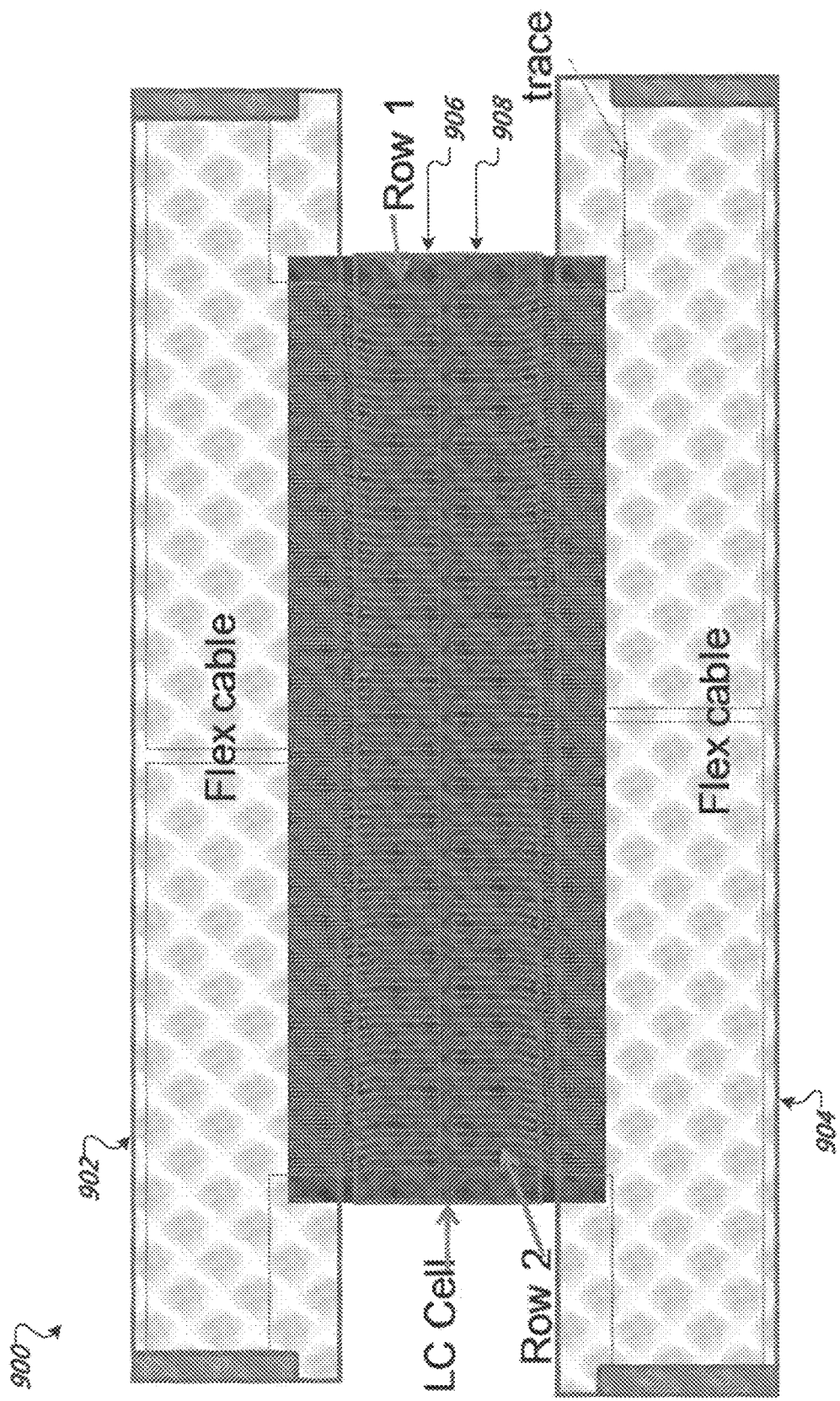
FIG. 9 shows a block diagram of an example polarization modulator array.

FIG. 9 shows a block diagram of an example polarization modulator array 900. The polarization modulator array 900 includes a first flex cable 902 and a second flex cable 904. The first flex cable is coupled to a first row of liquid crystal pixels 906. The second flex cable is coupled to a second row of liquid crystal pixels 908. The first row of liquid crystal pixels 906 can be used to control a first WSS of a dual WSS. The second row of liquid crystal pixels 908 can be used to control a second WSS of the dual WSS. Each flex cable includes a fan-out trace turn of 90 degrees to avoid blocking incoming light beams.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A dual wavelength selective switch comprising:
   first and second common port collimators, wherein each common port collimator is configured to receive one or more input optical beams the one or more input optical beams having a plurality of wavelength channels;
   first polarization conditioning optics;
   first beam expansion optics;
   a first dispersion component;
   a polarization modulator array having a plurality of polarizing modulation cells, each cell configured to independently change a polarization orientation of an optical beam passing through the cell;
   a second dispersion component;
   second beam expansion optics;
   a polarization beam splitter array;
   second polarization conditioning optics; and
   first and second sets of branch port collimators.

2. The dual wavelength selective switch of claim 1, wherein each common port collimator corresponds to a common port for a respective wavelength selective switch of the dual wavelength selective switch.

3. The dual wavelength selective switch of claim 1, wherein the first polarization conditioning optics and second polarization conditioning optics are configured to condition an input optical beam such that the one or more input optical beams have a uniform polarization orientation.

4. The dual wavelength selective switch of claim 1, comprising:
   a first lens optically coupled to a first side of the polarization modulator array; and
   a second lens optically coupled to a second side of the polarization modulator array.

5. The dual wavelength selective switch of claim 4, wherein one or more of the first and second lenses are configured to focus particular wavelength channels of light beams on respective pixels of the polarization modulator array.

6. The dual wavelength selective switch of claim 1, wherein the first common port collimator is optically coupled to the first set of branch port collimators and wherein the second common port collimator is optically coupled to the second set of branch port collimators.

7. The dual wavelength selective switch of claim 6, wherein optical paths of light beams between the first common port and the first set of branch port collimators are separated from the optical paths of light beams between the second common port and the second set of branch port collimators.

8. The dual wavelength selective switch of claim 1, wherein the first and second dispersion components comprise respective gratings.

9. The dual wavelength selective switch of claim 1, wherein the polarization beam splitter array includes stack of polarization beam splitters, wherein each polarization beam splitter of the stack is associated with particular branch collimators of the first and second sets of branch port collimators.

* * * * *